April 2, 1940.   W. F. ZIMMERMANN   2,195,912
WORM GEARING
Filed July 1, 1939   3 Sheets-Sheet 1

INVENTOR
William F. Zimmermann
BY
Albert F. Nathan
ATTORNEY

April 2, 1940. W. F. ZIMMERMANN 2,195,912
WORM GEARING
Filed July 1, 1939 3 Sheets-Sheet 2
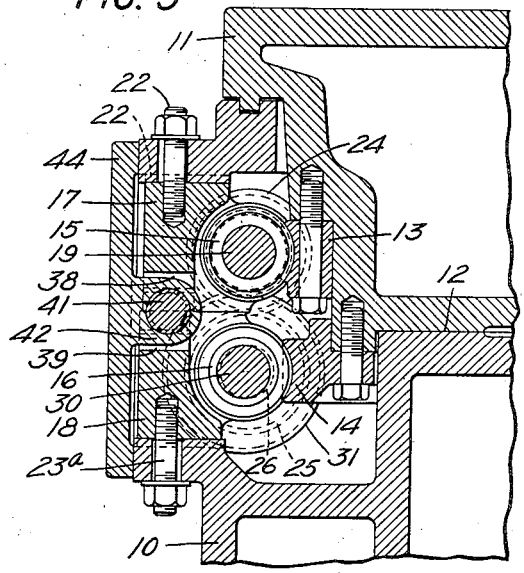
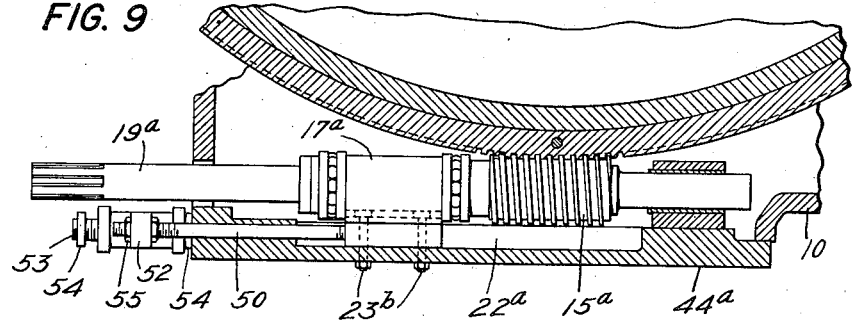
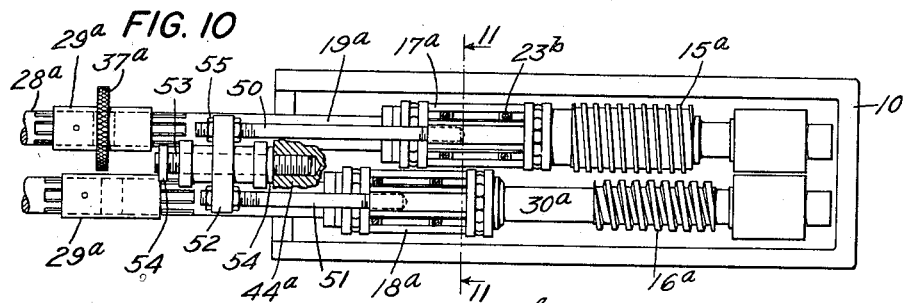
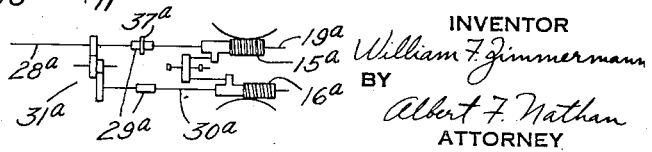
INVENTOR
William F. Zimmermann
BY
Albert F. Nathan
ATTORNEY April 2, 1940.  W. F. ZIMMERMANN  2,195,912
WORM GEARING Filed July 1, 1939   3 Sheets-Sheet 3

INVENTOR
William F. Zimmerman
BY
Albert F. Nathan
ATTORNEY

Patented Apr. 2, 1940

2,195,912

UNITED STATES PATENT OFFICE 2,195,912

WORM GEARING

William F. Zimmermann, Maplewood, N. J., assignor to Gould & Eberhardt, Newark, N. J., a corporation of New Jersey Application July 1, 1939, Serial No. 282,367

3 Claims. (Cl. 74—428)

This invention relates to worm gear drive transmissions wherein the highest degree of accuracy and precision in the rotation or indexing movements of the driven member is required.

The table drive of a gear hobbing machine is illustrative of a mechanism in which the acme of perfection is necessary in the timing and coordination of its movements with various other elements thereof in order to cut gears free of cyclic error.

Prior to this invention considerable difficulty has been encountered in synchronously propelling the work table, and various expedients, such as double or compounded drives, were used which were expected to divide and distribute the errors over larger sections and to minimize the error due to wear and progressively increasing backlash in the drive. Such devices have not, however, proved satisfactory, for reasons later explained.

The present invention aims to overcome the difficulties of the prior devices by a method of worm driving which, in the first instance, eliminates the source of a substantial portion of the wear and backlash that occasioned the difficulty in the earlier drives.

A further aim of the invention is to preserve to the greatest extent possible the accuracy initially built into the elements of a worm gear drive train so that the machine incorporating the worm gear drive may be operated over long periods of time before any parts become worn to the extent of requiring readjustment.

Still another object of the invention is to build into a worm gear transmission a simple means for compensating for the slight wear that inevitably occurs between the teeth of the worm and worm wheel so that the standard of accuracy once established in the drive may be maintained, without removing the machine from productive service, over a number of years of usage before replacement parts become necessary.

Another objective of the invention is to render available a worm gear driving transmission composed of a plurality of sets of synchronously driven worm and worm gears in a manner whereby but one of the sets is capable selectively of constituting the drive agency at any one time while the others are running idly and completely relieved of all driving load. Such a worm drive transmission is eminently suitable in mechanisms or machines in which two or more similar operations are performed, as for example, the roughing out operation on a work blank which is followed by one or more finishing operations.

With a worm drive of the character herein proposed, the roughing operations may be carried out while using one of the worm gear trains, while the following finishing operation on the same blank may be carried out by using another of the worm gear trains. In this way each worm gear train performs its propelling function during only a portion of the complete working cycle and the remaining worm gear trains, although they are running in synchronism, are definitely relieved of all driving load or fractions thereof.

The invention further proposes an improvement in worm gear transmissions embodying a plurality of worm gear trains in which the driving load may be transferred selectively from one train to another, and in which each train may be constructed with due regard to the duty it performs at the particular stage or time it is in service. For example, in the cutting of gears, there is usually a roughing out operation to partially form the teeth on the gear blank, followed by a finishing operation, which completes the teeth profiles to their proper shape and size. During the former operation large quantities of materials are removed and the teeth fashioned roughly. During the latter operation, much smaller quantities of metal are removed and the teeth brought true as to size and form, and it is a considerably more delicate operation that requires the highest order of precision. For this reason, the invention further proposes that the worm gear drive that takes the brunt of the load be more sturdily made and involve a relatively coarse pitch, whereas, the finishing drive which performs the lighter but more accurate work, embody a finer pitched worm and worm gear.

The worm gears of both trains are, however, to be driven synchronously at a ratio corresponding to the relation of their pitches so that the same output speed is produced, with selectivity in load transfer, with either set.

The aims of the invention may be attained by securing at least two worm wheels to the member to be driven and to mesh therewith two synchronously driven worms. Preferably one of the sets is formed with a relatively coarse pitch and the other set with a relatively fine pitch, and the worms of both sets directly geared together in the proper ratio required to produce a uniform speed of rotation in the driven member irrespective of which of the trains is the driver at any particular time.

As before explained the respective worm gear sets are used neither in parallel nor in series, but each is used independently and exclusively of the other. To that end each worm gear element is provided with a mounting whereby it is bodily adjustable slight amounts in a direction increasing or decreasing the clearance between the teeth of the gear and the thread of the worm. Both worm mountings are, however, mechanically connected together so that an "out" adjustment of one automatically effects an "in" adjustment of the other. In other words, when one worm is in driving position the other is out of driving position and out of tooth contact. Although, the "out" worm is rotating continuously and in phase with the teeth of its related gear, there is no wear on the threads thereof because of the absence of tooth contact.

So long as the worms are geared together in their proper speed ratio, one of the worms may be turned by hand and so screw itself tangentially along the teeth of its related worm wheel until sufficient tooth clearance is assured, and the other worm will screw itself conversely into proper driving relation with its related wheel. If the worm threads progressively diminish in thickness, the extent of axial shifting of the worms to effect a complete transfer of load from one set to the other is materially reduced.

A like result is attained if the worm mountings are such as to permit adjustment in worm axes in a direction radially, or substantially so, of their respective wheels. In such an arrangement the extent of movement need be only as much as .020" on each mounting to effect a complete withdrawal of one worm from active duty and proper tooth engagement of the other. The worms, it will be seen, are not required to be moved out of mesh with the teeth of the worm wheels, but merely separated therefrom a few thousandths of an inch so as to exaggerate the tooth clearance. The other worm is, of course, connected to move into engagement at a rate comparable to the rate that the other moves out so that complete transfer of load automatically is attained. Adjustments to compensate for wear on the threads of the individual worms are made preferably independently on each worm so that the above explained relation of center distances and movements is not disturbed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

The drawings disclose the invention embodied in a work table driving transmission, in which Figures 1 and 2 are respectively plan and side views, partly in section, of one form of drive.

Fig. 3 is a vertical section taken along line 3—3 of Fig. 2.

Figs. 9 and 10 are views similar to Figs. 1 and 2, of a variant form of worm adjusting mechanism.

Fig. 12 is a diagram of the drive gearing.

Figure 13:
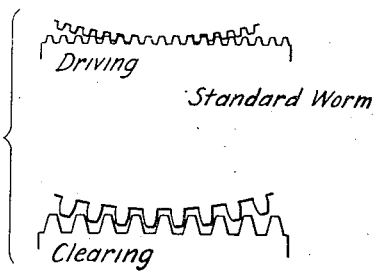
Figure 14:
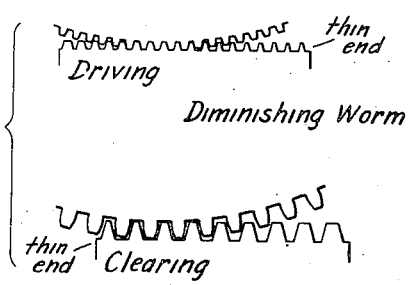
Figure 15:
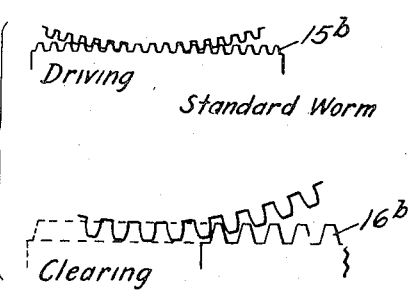

Figs. 13, 14, and 15 are diagrammatic views of driving and clearing positions of synchronously driven worm and worm wheels.

The invention will be explained first with particular reference to the embodiment shown in Figs. 1, 2, and 3 of the drawings. In these figures the numeral 10 represents a base for a revolving work table 11. Annular bearing surfaces 12 are provided between the base and table for receiving the downward thrusts while additional surfaces (not shown in the drawings) are provided between the base of the table for guiding and supporting the table in its movements about a central axis. Secured or otherwise provided on the outer periphery of the table are two table driving worm gear wheels 13 and 14, the teeth of which are continuously in mesh with the threads of a pair of worm gears 15 and 16. The worm gears are journaled in adjustable brackets 17 and 18 supported by the base of the machine. Inasmuch as the brackets 17 and 18 are substantially identical, a description of one will suffice.

Figure 1:
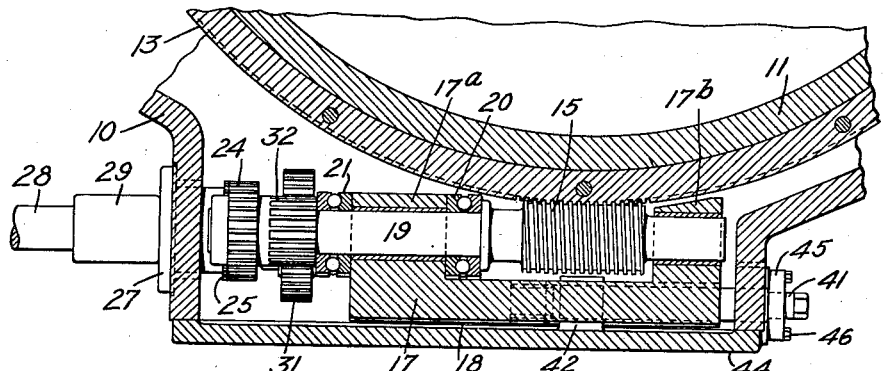

With reference to Fig. 1, the bracket 17 is formed of two projecting journal bearing portions 17a and 17b positioned one at each side of the worm 15. The worm shaft 19 extends through the bracket and is provided with axial thrust bearings 20, 21 on either side of the journal 17a. By virtue of this construction the worm 15 is supported at both sides and is restrained against axial shifting in the bracket. The bracket itself is restrained against shifting by means of a transverse key 22 which interlocks with the main frame of the machine, and a series of clamp bolts 23 which clamp the bracket securely in a predetermined position radially of the gear wheel 13.

The outer end of the worm shaft 19 carries a gear 24 which meshes continuously with a gear 25 on a short stub shaft 26 journaled in a bearing 27 secured to the main frame. The stub shaft 26 connects with a source of power represented by the shaft 28 by means of a coupling 29.

Figure 2:
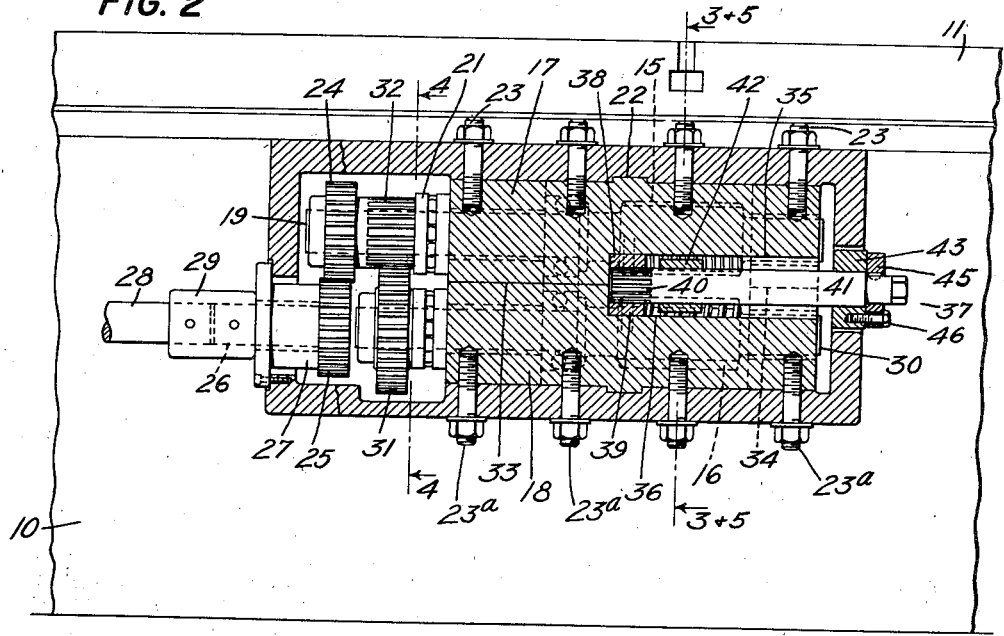
Figure 7:
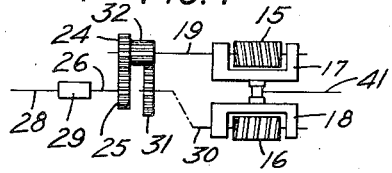
Figs. 7 and 8 are diagrammatic views illustrating the gearing required between worms when using two worms of the same hand, and worms of opposite hand.
Figure 8:
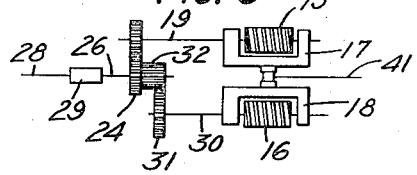

The lower worm 16 is similarly mounted in the adjustable bracket 18 and receives power through the gears 31, 32 from the worm shaft 19 as illustrated in Figs. 2 and 7, or it may, if desired, receive power direct from the stub shaft 26 in a manner indicated diagrammatically in Fig. 8. In the former case (Figs. 2 and 7) the respective worm shafts 19 and 30 will be driven in opposite directions and accordingly opposite hand worms and worm wheels are required in the drive, whereas, in the latter case, Fig. 8, the worm shafts are driven in the same direction and therefore the worms and worm wheels may be of the same hand.

When the two brackets 17 and 18 are assembled in the machine frame their adjacent surfaces 33, 34 are matched to afford a sliding fit without permitting undue falling of the bracket 17 when the upper clamp bolts 23 are released.

Each bracket may be recessed as at 35, 36, to accommodate an adjusting mechanism indicated generally as 37. The adjusting mechanism comprises essentially a gear rack 38 secured to the bracket 17 and an apposed rack 39 secured to the bracket 18, and both racks are meshed with a pinion gear 40. The pinion 40 is cut on a shaft 41 journaled in bearings 42 and 43 provided by the main cover plate 44. With the upper and lower sets of clamp bolts 23 and 23a released, a turning of the pinion shaft 41 will effect a shifting of the worm assemblies in opposite directions radially of the gear wheels.

In accordance with this invention only one of the worms 15 and 16 is to be in driving relation with its related worm wheel at any given time, and the proper driving relation is established when the pitch line of the thread of the worm is coincident with the pitch line of the teeth of the gear, allowing a normal running clearance of approximately .001" on each flank. When this relation has been established by the turning of the squared end of the pinion shaft 41, the corresponding set of clamp bolts 23 is tightened. Meanwhile the other worm assembly has been shifted slightly away from its related worm wheel so that there is approximately .003" to .004" between each of the flanks of the worm thread and the sides of the teeth in the gear wheel.

The outwardly moving worm, however, is never moved out of mesh with teeth of its wheel, but only the very slight distance necessary to position its thread out of physical contact with the teeth of the worm wheel. In this way the driving load may be transferred completely from one worm to the other, and the idling worm positioned definitely out of contact with its wheel although it remains substantially fully in mesh therewith.

When the proper driving position of each worm has been established, a stop collar 45 keyed to the adjusting shaft 41, is clamped to the frame by one or more screws 46. For convenience in re-establishing the predetermined driving relation between each worm and its worm wheel, the diameter of the screws 46 and of the holes 47 in the stop collar are so related and proportioned as to limit the angular movement of the adjusting shaft in either direction to the extent required alternately to position either worm in proper meshing relation with its worm wheel.

Figure 4:
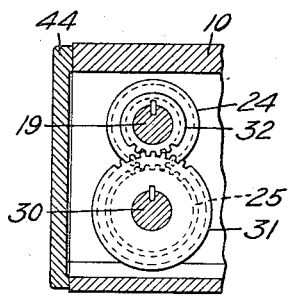
Fig. 4 is a vertical section along line 4—4 of Fig. 2.
Figure 5:
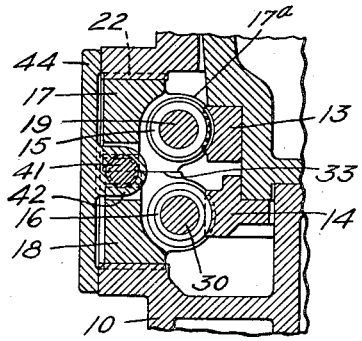
Fig. 5 is a vertical section along line 5—5 of Fig. 2, illustrating the worms in a position the reverse of that indicated in Fig. 3.
Figure 6:
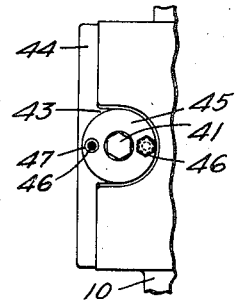
Fig. 6 is an end elevation of a form of stop mechanism for limiting inward movement of the worms.

As illustrated more clearly in Figs. 3, 4, and 5, the axes of the respective worm shafts and main drive shaft are arranged in a single plane and inasmuch as the lateral shifting of the worm assemblies is so little in effecting a complete load transfer, the amount of roll of the gear 24 relative to the driving gear 25 is negligible.

In Figs. 2 and 7 of the drawings, a speed reduction between worm shafts 19 and 30 is indicated. This is for the purpose of giving the lower worm 16 a smaller R. P. M. than the worm 15 for the reason that, in the embodiment illustrated, the upper worm gear set is of fine pitch and the lower gear set is of relatively coarse pitch, and the ratio of the gearing between shafts 19 and 30 is such as to produce identical table speeds through either set. Obviously, if the resulting speeds are not identical, the transmission never could be operated.

In the application of the invention to a gear hobbing machine table drive, the use of relatively fine and coarse pitch worm gear sets in combination with the feature of selectively available means for transferring the load from one set to the other, is of particular importance. In the cutting of gear teeth, extreme precision is required in the indexing movements of the table to bring about the high degree of accuracy essential in the spacing of the teeth on the work. Usually, and particularly as to the larger sizes of gears, there is first a roughing cut made all around the blank which removes large quantities of metal and forms the teeth to their approximate size and shape. Then the hob cutter is changed for a finishing cutter and a second or finishing operation is performed on the roughed out teeth of the blank.

The present invention aims to afford a table drive in which the error usually incident in worm drives is reduced to minimum portions to the end that gears may be cut with a higher degree of precision than has heretofore been attained. Those ends may be achieved with the present invention by utilizing two worm gear drives, one to be used exclusively for the roughing out operations and the other to be used exclusively for finishing operations, and in addition, to give the finishing worm gear set a pitch of ½ or ⅓ of the pitch of the roughing set. Accordingly, any error that is introduced in the teeth of the roughed out gear blank by reason of the characteristics or actions of the roughing worm gear set 14, 16, such errors are corrected by the action of the considerably finer gear set 13, 15 when the latter set is brought into operation. If the finishing gear wheel 13 is provided with three teeth for every one tooth of the teeth of the roughing gear wheel 14, the errors are proportionately reduced and distributed over a larger number of teeth. And since the finishing set is the driving agency only when performing the lighter and more delicate operation of finishing incompleted teeth, the initial accuracy built into the finishing worm gear set is conserved indefinitely. During the heavier operations of roughing out the gear blank the table is propelled exclusively by the more sturdy gear set 14, 16, and the finishing set runs not only load free, but out of physical contact so that no wear whatever takes place on the thread or teeth.

Instead of shifting the worms radially of the wheels the few thousandths required to effect a complete transfer of load from one worm to the other, a similar result is attained by shifting the worms axially. Such arrangement is illustrated in Figs. 9-12 and 14 which mechanism is described and claimed more fully in my copending application Serial No. 266,080, filed April 5, 1939. In this variant form, the respective worms are again journaled in adjustable bearing blocks 17a and 18a mounted in slideways 22a disposed parallel to the axes of the respective shafts. Each worm has a thread which progressively diminishes in thickness from one end to the other so that a shifting of the worm axially in one direction will bring a thinner portion of its thread into mesh with the teeth of its gear. If the two worms 15a and 16a are arranged with the thinner portions of their threads axially opposite each other, both worms may be shifted in the same direction which will take one worm thread out of driving relation with its gear and simultaneously bring the other worm thread into driving relation with its gear.

Figure 11:
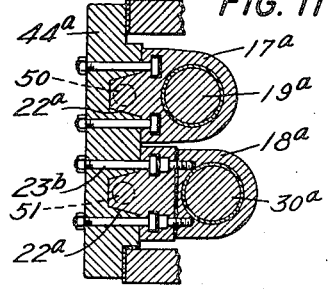
Fig. 11 is a sectional view along line 11—11 of Fig. 10.

A preferred form of mechanism for simultaneously adjusting the worms is illustrated in Figs. 9-11 of the drawings which comprises two adjusting rods 50, 51, connected at their ends by a common adjusting plate 52. The plate 52 is axially adjustable on a stud shaft 53, and the limit of adjustment in each direction is determined by a stop 54. Each of the rods 50, 51 is secured to the worm bearing brackets 17a and 18a so that both bearing blocks move together.

The worms are driven, in a manner similar to that previously described, from a power shaft 28a which connects through the splined coupling 29a to the splined finishing worm shaft 19a. Reduction gearing 31a, ratioed in accordance with the relative pitches of the worms, connects the roughing worm shaft 30ᵃ to the finishing worm shaft.

Normally each worm bearing bracket is bolted fast to the cover plate 44ᵃ by means of T bolts 23ᵇ. When it is desired to shift the worms, for either load transfer or wear compensation, the bolts 23ᵇ are released and by turning the hand wheel 37ᵃ the worms may be caused to screw themselves along the teeth of their respective gears until a connecting plate 52 engages one of the stops 54. This operation automatically adjusts the thread of one worm out of physical contact with the teeth of its related gear and the thread of the other worm into driving relation with the teeth of its gear. Neither worm, however, is out of mesh with the teeth of its gear at any time. Both are continuously rotating, each in phase with it gear, but only one is the driving agent at any given instant, while the other is turning load free and definitely out of physical contact with the teeth of its gear wheel. Compensation for wear on the thread of the worms may be effected by adjusting the worms axially independently of each other by means of the adjusting nuts 55 which secure each adjusting rod to the common adjusting plate.

The diminishing worm suitable for this purpose is explained more in detail in my aforementioned application, and briefly is a worm which has one side of its thread formed with the uniform lead, and the other side formed with a uniform lead of slightly shorter lead so that the axial thickness of the thread progressively diminishes toward one end, and the space between convolutions progressively increasing. If the difference between the long and short leads on the thread is .012" per axial inch along the worm, it will require only approximately 1" of worm movement in an axial direction to produce that same amount of clearance between the worm thread and the teeth of the gear. This is ample to effect complete load transfer without danger of teeth contact on the thread of the idling worm.

Fig. 15 of the drawings illustrates diagrammatically a further method of transferring the load from one worm gear to the other that does not involve a dual lead type of worm. In this form the worms 15ᵇ and 16ᵇ are provided with standard uniform lead threads. They are mounted in shiftable bearing blocks similar to the arrangement shown in Figs. 9 and 10, but offset from each other approximately their full length, as shown in Fig. 15. In this form, the worms may be shifted simultaneously in one direction, or simultaneously in opposite directions to position one fully into normal driving relation with the gear teeth of its related wheel, and the other definitely out of driving relation and out of contact with the teeth of its wheel. In this instance compensation for wear may also be effected by shifting the worms laterally relative to each other as in Fig. 5, or a new worm thicker in thread substituted. The same worm driving arrangements, as those previously explained, may be used, longer splined couplings 29ᵃ being necessary, however, because of the greater extent of movement of the worm gears.

In this embodiment, as in the others, both worms are continuously being driven, both remain in phase with their respective worm wheels at all times, but only one may constitute the driving agent at any instant, while the other is idling and out of physical contact with the teeth of its related gear.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A uniform speed driving transmission having in combination two sets of gear elements secured to a member to be driven, each set comprising a driven gear and a driving gear continuously maintained in meshing relation therewith, means mounting one of the gears of each of said sets for slight movement radially of its related gear selectively to position its pitch line into or out of proper driving position with respect to the pitch line of its related gear, and means for simultaneously conversely adjusting the adjustable gear of the other set a slight amount radially of its associated gear, thereby to effect complete transposition of the load from one of said sets of driving and driven gears to the other without withdrawing either adjustable gear from mesh with its associated gear.

2. In worm gearing the combination of two differently pitched worm gear wheel elements secured to a member to be driven; two complementary pitched driving worm gear wheels continuously maintained in phase relation with their respective worm wheels, power means for rotating said worm gears in synchronism; means mounting each one of the worm gears for movement a slight amount radially of its related gear wheel selectively to position the thread thereof into or out of proper driving relation with the teeth of the wheel; and means for conversely shifting said adjustable gears radially simultaneously thereby to effect a drive electively through one of said worms to the exclusion of the other, without withdrawing the thread of either worm from mesh with the teeth of its worm wheel.

3. In worm gearing the combination of two worm gear wheels secured to a member to be driven, two laterally adjustable driving worm gears, each adapted continuously to mesh with the teeth of one of said gear wheels and maintained continuously in phase therewith, a power shaft common to both of said worm gears and connections therewith for driving said worms in synchronism, means operable to adjust one of said worm gears laterally of the axis of its worm wheel to bring the thread thereof into proper driving relation with the teeth of said worm wheel, and means for adjusting the other of said worm gears laterally of the axis of its worm wheel to position the thread thereof out of contact but not out of mesh with the teeth of its related wheel thereby to effect the complete transfer of the driving load from one of said worms to the other.

WILLIAM F. ZIMMERMANN.